(12) United States Patent
Chen

(10) Patent No.: US 6,601,795 B1
(45) Date of Patent: Aug. 5, 2003

(54) AIR VEHICLE HAVING SCISSORS WINGS

(76) Inventor: Zhuo Chen, 807 Hampton Crossing, Norcross, GA (US) 30093

( * ) Notice: Subject to any disclaimer, the term of this patent is extended or adjusted under 35 U.S.C. 154(b) by 0 days.

(21) Appl. No.: 10/227,130

(22) Filed: Aug. 23, 2002

(51) Int. Cl.[7] ................................................. B64C 3/38
(52) U.S. Cl. .......................................... 244/46; 244/39
(58) Field of Search ........................ 244/6, 7 R, 17.11, 244/34 R, 35 R, 39, 46

(56) References Cited

U.S. PATENT DOCUMENTS

| | | | | |
|---|---|---|---|---|
| 1,355,088 A | * | 10/1920 | Carneal | 244/34 R |
| 3,279,721 A | * | 10/1966 | Dethman | 244/46 |
| 3,653,611 A | * | 4/1972 | Trupp et al. | 244/48 |
| 3,971,535 A | * | 7/1976 | Jones | 244/46 |
| 4,132,374 A | * | 1/1979 | Abell | 244/46 |
| 4,589,611 A | * | 5/1986 | Ramme et al. | 244/6 |
| 4,711,415 A | * | 12/1987 | Binden | 244/17.19 |
| 4,998,689 A | * | 3/1991 | Woodcock | 244/46 |
| 5,154,370 A | * | 10/1992 | Cox et al. | 244/3.27 |
| 5,405,104 A | * | 4/1995 | Pande | 244/7 A |
| 5,671,898 A | * | 9/1997 | Brown | 244/46 |
| 5,992,796 A | * | 11/1999 | Smith | 244/45 A |

FOREIGN PATENT DOCUMENTS

| | | | |
|---|---|---|---|
| DE | 4140139 A1 | * 6/1993 | 244/46 |
| IT | 505188 | * 12/1954 | 244/46 |
| IT | 510430 | * 1/1955 | 244/46 |

* cited by examiner

*Primary Examiner*—Michael J. Carone
*Assistant Examiner*—Daniel Matz

(57) ABSTRACT

An air vehicle, such as an aircraft, an unmanned air vehicle, a missile, or an aero bomb that has a fuselage and two main wings each of which has a left side wing and a right side wing. Both of the main wings are rotatably mounted on the fuselage via one or two pivots or hollow turrets so that both of them can be yawed during flight to optimize flying efficiency under various flying conditions.

2 Claims, 12 Drawing Sheets

AIR VEHICLE HAVING SCISSORS WINGS

CROSS-REFERENCE TO RELATED APPLICATIONS

Not Applicable

FEDERALLY SPONSORED RESEARCH

Not Applicable

REFERENCE TO SEQUENCE LISTING, A TABLE, OR A COMPUTER PROGRAM LISTING COMPACT DISK APPENDIX

Not Applicable

1. Background of the Invention—Field of Invention

The invention relates to air vehicles such as manned and unmanned aircraft, missiles, and bombs that fly in the air and, in particular, to air vehicles having scissors wings that improve their aerodynamic performance at a wide range of speed.

2. Background of the Invention—Description of Prior Art

The contradictory requirement of wing aspect ratio at high speed and low speed flying is a major obstacle preventing existing air vehicles from efficiently and effectively flying at both low speed and high speed up to supersonic speed.

The aspect ratio of a wing is defined as the square of the wingspan divided by the area of the wing. At transonic and supersonic flying, wings of low aspect ratio, such as delta wings and swept-back wings, are preferred for air vehicles because they have much less drag than wings of high aspect ratio. However, wings of high aspect ratio are preferred for air vehicles in the condition of low speed flying, take-off, and landing because they have higher lift-to-drag (L/D) ratio than wings of low aspect ratio. This contradictory requirement of aspect ratio for flying at high speed and low speed makes existing supersonic aircraft with wings of low aspect ratio inefficient in the flying conditions of low speed flying, take-off, and landing.

Concorde, the supersonic passenger aircraft having a pair of delta wings, needs a long take-off run to reach its 400 kilometers/hour (250 miles/hour) take-off speed that is higher than the take-off speed of most subsonic aircraft like Boeing 747. In addition, the low lift-to-drag ratio (L/D) of its delta wings demands high engine thrust to take-off and fly at low speed, making Concord a noisy aircraft around airports. The requirement of high engine thrust at low speed also makes Concorde consume a lot of fuel to climb to its cruise altitude, contributing to the high operating cost of the aircraft.

Although modern fighter aircraft with wings of low aspect ratio have excellent take-off and landing performance, it is mainly achieved by high thrust-to-weight ratio and low wing loading, which are too costly and inefficient for non-fighter aircraft. In other words, at an expense of high fuel consumption, fighter aircraft mainly rely on high engine thrust and big wings to achieve short take-off and landing.

In addition, the "area rule" of transonic and supersonic flying adds another problem to aircraft with wings of low aspect ratio. In order to conform to the "area rule" to have low transonic and supersonic drag, aircraft with wings of low aspect ratio usually need to have a fuselage with an indentation, or "wasp waist", around the place where wings are installed. This "wasp waist" increases the cost to manufacturer the aircraft and reduces the spaces for payload such as passengers and cargo.

One attempt to make aircraft efficiently flying at both low and high speed is variable sweep wings. The concepts of aircraft with variable sweep wings are shown in U.S. Pat. No. 3,053,484 issued to W. J. Alford, Jr. et al, U.S. Pat. No. 3,405,280 issued to F. G. Willox et al, U.S. Pat. No. 3,405,891 issued to R. Jacquart et al, and U.S. Pat. No. 3,447,761 issued to P. C. Whitener et al. Existing aircraft like Boeing B-1B bomber have adopted variable sweep wings. According to the configuration, at take-off, landing, and low speed flying, the sweepback angle of the wings is small, making the wings somewhat similar to a pair of straight wings. At high speed flying, the wings are swept back so that the sweepback angle is big, making the wings similar to a pair of swept-back wings.

Variable sweep wings have structure and control disadvantages. The pivotally mounted left and right wings generate huge bending moments on the left and right pivot points at wing roots. In order to transfer the bending moments as well as ensure the smooth swiveling of the wings, the pivot points must be structurally strong and thus structurally heavy. These heavy pivot points and the additional control system for swiveling the wings make an aircraft structurally inefficient. In addition, the swiveling of the wings changes the center of lift and center of gravity of the aircraft, requesting large horizontal stabilizers to balance the aircraft. Some aircraft even have a system that can quickly transfer fuel from one place to another place in the aircraft to facilitate the balancing of the aircraft when the wings are swiveling. The shift of center of lift and center of gravity make the aircraft difficult to control, and the large horizontal stabilizers and fuel transfer system also add weight to the aircraft.

Oblique wing is another attempt to optimize both high speed and low speed performance by modifying the wing configuration of an air vehicle during flight. This concept is shown in U.S. Pat. Nos. 3,971,535 and 3,737,121, both issued to R. T. Jones, and U.S. Pat. No. 5,154,370 issued to J. W. Cox et al. The basic idea of oblique wing is to have a main wing pivotally installed on the fuselage or fuselages of an aircraft. The pivotal attachment allow the main wing to be yawed relative to the fuselage or fuselages for high speed flight, and to be positioned at right angles with respect to the fuselage or fuselages during take-off, landing, and low speed flight.

Oblique wing configuration has inherent stability and control disadvantages. One problem is the coupling of roll and pitch movement of the aircraft. For example, suppose the wing is yawed to an angle so that the right side of the wing becomes a swept-forward wing, the left side of the wing becomes a swept-back wing, and the aircraft uses ailerons or flaperons to achieve roll control. When the pilot of the aircraft wants to bank the aircraft to the left, the aircraft will make an unexpected nose-up movement while banking to the left. On the country, when the pilot wants to bank to the right, the aircraft will make an unexpected nose-down movement while banking to the right. The reason of this problem is that the ailerons or flaperons on the left and right wings are not located along the same transverse axis thus generate pitch movement moments when they are adjusted to roll the aircraft. Another problem is that the aerodynamic lift generated by the oblique wing is not evenly distributed along the long axis of the wing when the wing is at a high yaw angle from perpendicular to fuselage. This causes a roll moment on the aircraft. In order to solve this problem, both U.S. Pat. Nos. 3,971,535 and 3,737,121 issued to R. T. Jones invent the wing to be upwardly curved at both ends of the wing. The upward curved ends make the swept-forward part of the oblique wing has a higher angle-of-attack than the swept-back part of the wing. By constructing the wing to a specific upward curvedness, the aircraft can fly at a certain speed with the wing yawed at a certain angle without generating the unexpected roll moment. However, this fixed upward curvedness cannot eliminate the roll moment at a wide variety of flying conditions, limiting the flexibility of an oblique wing aircraft.

U.S. Pat. No. 4,998,689 issued to R. R. Woodcock and U.S. Pat. No. 3,155,344 issued to R. Vogt show a concept of "two-position wing". The "two-position wing" is rotatably mounted on the fuselage of an aircraft and consists of two sets of wings, one set is a pair of supersonic wings and another is a pair of subsonic wings. At low speed flying, take-off, and landing, the "two-position wing" is at a position that the pair of subsonic wings is used and the pair of supersonic wings is attached to the fuselage. At supersonic flying, the "two-position wing" rotates 90 degrees to another position so that the pair of supersonic wings generates lift but the pair of subsonic wings is attached to the fuselage.

This concept has two disadvantages. First, both the supersonic and subsonic wings have to have their airfoils and shapes fit to both wing positions. This requires the compromise of key parameters of the wings for both wing positions. For example, in order to have small drag and good controllability when the pair of subsonic wings is attached onto the fuselage, the pair of subsonic wings is better to have a front-and-rear symmetry airfoil. But this airfoil is not the desired one to generate lift when the pair of subsonic wings is used at low speed flying, take-off, and landing. This kind of compromise prevents the wings from having the optimum shape and airfoils as well as the desired flaps and ailerons, or flaperons, to generate lift. Second, the aircraft is difficult to control and maintain stability when the "two-position wing" is shifting from one position to another position. During the shifting of positions, the aircraft is very easy to have an unexpected roll movement just as an oblique wing because the lift it generates is not distributed evenly along the wing when the wing is being rotated to have a big yaw angle from perpendicular to fuselage.

U.S. Pat. No. 5,671,898 issued to B. B. Brown and U.S. Pat. No. 4,913,378 issued to G. E. Calvert are inventions using a secondary wing in addition to the high speed wing to help the aircraft achieve short take-off and landing and efficient low speed flying. The secondary wing of both inventions is rotatably mounted on the fuselage of the aircraft. During take-off, landing, and low speed flying, the secondary wing is generally perpendicular to the longitudinal axis of the fuselage to generate lift. At high speed flying, the secondary wing is rotated at 90 degrees so that it forms a part of the fuselage. This concept still has the problem of generating unexpected roll movements similar to that of oblique wing and "two-position wing" when the secondary wing is being rotated to big yaw angles from perpendicular to fuselage. In addition, the secondary wing adds weight to the aircraft without generating lift at high speed flying, making the aircraft have low structural efficiency and consumes more fuel to carry this weight.

Coplanar joined wings shown in U.S. Pat. No. 5,899,410 issued to T. M. Garrett is a concept having a pair of forward wings extending from the fuselage of an air vehicle laterally outward and backward, and a pair of aft wings extending from the fuselage laterally outward and forward. Each forward wing is connected with the respective aft wing at a common wingtip to form a joined wing. The forward and aft wings are on the same plane to be mutually coplanar and the coplanar joined wings can be either fixed wings or variable wings. As variable wings, coplanar joined wings have two ways to change sweep angles. The first way of changing sweep angles is that either the wing root of the forward wings or the wing root of the aft wings or the wing roots of both can be moved along the longitudinal axis of the fuselage. Another way of changing sweep angles is that a pair of outer wings are rotatably mounted on the two joints of the forward and aft joined wings so that the sweep angle of the outer wings can be adjusted similar to variable sweep wings.

Both as fixed and variable wings, the coplanar joined wings have a disadvantage of unfavorable aerodynamic interference. Positioned at the downstream of the forward wings, the aft wings are inefficient in generating lift because their incoming airflow is the distorted airflow just passes through the forward wings. As variable joined wings using the above-mentioned first way to change sweep angles, the fuselage requires a track structure along its longitudinal axis. This track structure not only guides the movement of the wings but also should be strong enough to transfer load from the wings to the fuselage. Such a track structure increases the structural weight of the air vehicle. When using the above-mentioned second way to change sweep angles, the configuration has disadvantages similar to those of variable sweep wings. One of these disadvantages is the low structural efficiency caused by the pivotal points that not only have to sustain high bending moments but also should ensure the smooth swiveling of the outer wings. Another one is the stability and control problems caused by the shifting of center of lift and center of gravity when the outer wings change sweep angle.

Patent JP 404317891 A "Aircraft for Vertical Take-Off and Landing" issued to H. Hatano is an invention utilizing two sets of rotor/wings that can convert between rotors and fixed wings. The two sets of rotor/wings are either mounted above the fuselage of an aircraft in tandem with one rotor/wing in front of another, or co-axially installed above the fuselage with one rotor/wing above another. During take-off, landing, and low speed flying, the rotor/wings rotate in opposite directions to make the aircraft flying just as a helicopter. At high speed, both of the rotor/wings stop rotating to become fixed wings and the yaw angles of both fixed wings can be changed to fit different speeds.

The rotor/wings of the invention have to compromise their aerodynamic performance and structures to fit both the helicopter and fixed-wing modes. For example, the leading edge of one side of a rotor/wing at helicopter mode becomes the trailing edge of the rotor/wing at fixed-wing mode. This makes the airfoils of the rotor/wing difficult to have high efficiency at both helicopter and fixed-wing modes. This shift between leading edge and trailing edge also makes it difficult to arrange flaps, ailerons, or flaperons on the rotor/wings. In addition, when both of the rotor/wings are co-axially mounted above the fuselage, the hub of the rotor/wings are very difficult to be built in small size because it has to contain control mechanisms to control the cyclic pitch, collective pitch, and sweep angles of two counter-rotating rotor/wings. This makes the hub very easy to generate big drag at high speed flying, especially at supersonic flying.

X-wing configuration, as shown in U.S. Pat. No. 4,711,415 issued to J. A. Binden, consists of a rotor/wing that can work as a rotor at helicopter mode and a fixed "X" shape wing at fixed-wing mode. The airfoils of X-wing are also difficult to have high efficiency at both helicopter mode and fixed-wing mode because the leading edges of some blades of the rotor/wing at helicopter mode become trailing edges at fixed mode. For the same reason, it is also very difficult to arrange flaps, ailerons, or flaperons on X-wing. Furthermore, the sweep angles of the blades of a X-wing at fixed-wing mode are affected by the requirement of helicopter mode, normally with two blades at 45 degrees sweepback angle and two blades at 45 degrees sweep forward angle, making the rotor/wings difficult to have high efficiency at a wide range of speed when flying at fixed-wing mode.

BRIEF SUMMARY OF THE INVENTION

The fundamental object and advantage of my invention is to build an air vehicle that can efficiently and effectively fly at a wide range of speed. Specifically, the objects and advantages of an air vehicle based on my invention are:

1. Have low take-off and landing speeds and can take-off and land over a short distance;

2. Have low engine noise and low fuel consumption during take-off, landing, and flying;

3. Can efficiently fly at transonic speed and low supersonic speed without generating sonic boom;

4. Is easy to control and have good stability;

5. Have high structural efficiency and is easy to manufacturer;

6. Can be stored or carried with compact lateral dimension without adding significant weight and complexity.

A scissors wings configuration has been invented to achieve the above-mentioned objects and advantages. The invention has a fuselage and two continuous main wings. Both of the main wings are rotatably mounted on the fuselage and they can be yawed in opposite directions relative to the fuselage. One way to install the main wings is to have one main wing mounted above or at the upper part of the fuselage and another mounted beneath or at the lower part of the fuselage. The second way to install the main wings is to mount both of the wings above or at the upper part of the fuselage with one main wing over another. Similarly, the third way to install the main wings is to mount both of the wings beneath or at the lower part of the fuselage with one main wing over another. The fourth way to install the main wings is to mount both of the main wings at around the middle part of the fuselage with one main wing over another.

The following paragraphs explain how can the invention achieve the above-mentioned six objects and advantages.

First, the invention can make an air vehicle have low take-off and landing speeds and can take-off and land over a short distance. During take-off and landing, both of the main wings can be rotated to a position so that their long axes are either generally perpendicular to the longitudinal axis of the fuselage or only have a small yaw angle from perpendicular to the fuselage. By this way, the air vehicle has two high aspect ratio wings that have high lift-to-drag ratio (L/D) at low speed. This arrangement can make the air vehicle have low take-off and landing speeds and have short take-off and landing distances.

Second, the invention can make an air vehicle have low engine noise and low fuel consumption during take-off, landing, and flying. When the axes of the main wings are either generally perpendicular to the longitudinal axis of the fuselage or have a small yaw angle from perpendicular to the fuselage, they are of high aspect ratio thus when generating the same lift, they have much less drag than wings of low aspect ratio. The much less drag makes relatively low engine thrust enough to power the air vehicle to take-off, land, and fly at low speeds, resulting in low engine noise and low fuel consumption. In addition, the rotatable scissors wings can be yawed to different angles from perpendicular to the fuselage so that the air vehicle can have the optimum lift-to-drag ratio (L/D) virtually at any speed within its flight envelop, making the air vehicle only need relatively low engine thrust throughout its flying at different speeds. Furthermore, when the air vehicle is flying at a supersonic speed and its scissors wings are yawed at a big angle from perpendicular to the fuselage, the scissors wings can have a very smooth cross-sectional area distribution along its longitudinal axis. This means the air vehicle is very easy to be designed to conform to the "area rule", making it only need relatively low engine thrust to penetrate the sonic barrier and fly at supersonic speeds. All the above-mentioned characteristics make an air vehicle with scissors wings capable of achieving low engine noise and low fuel consumption at every stage of its flights.

Third, the invention can make an air vehicle efficiently fly at transonic and low supersonic speed without generating sonic boom. When yawed at a big angle from perpendicular to fuselage, the supersonic drag characteristics of an air vehicle with scissors wings is similar to that of an air vehicle with oblique wing because both have similar cross-sectional area distribution along the longitudinal axis of fuselage, and both are composed of generally straight, continuous wing or wings yawing at an angle. According to U.S. Pat. No. 3,971,535 issued to R. T. Jones, oblique wing configuration can make an air vehicle fly up to Mach 1.3 without generating sonic boom. As the scissors wings configuration has the similar supersonic drag characteristics as oblique wing configuration, air vehicle having scissors wings is also able to fly at low supersonic speeds without generating sonic boom. This feature makes an air vehicle with scissors wings able to fly over population centers at a supersonic speed without disturbing people on the ground with sonic boom.

Forth, the invention can make an air vehicle easy to control and have good stability. An air vehicle of scissors wings configuration can generate symmetric moments along its longitudinal axis at any speed within its flying envelope. These symmetrically distributed moments prevent scissors wings configuration from having the two control and stability problems of oblique wing configuration. The two problems of oblique wing are the coupling of roll and pitch movement, and the roll moment generated by the uneven distribution of lift along the oblique wing when the wing is yawed at a big angle from perpendicular to fuselage. In addition, scissors wings configuration does not have the control and stability problems generated by the shifting of center of lift and center of gravity that bothers variable sweep wing configuration. The yawing of the scissors wings makes little, if any, shift of center of lift and center of gravity. Even the shift of center of lift from subsonic flying to supersonic flying is small because the scissors wings are of slender shape with narrow wing chord, making the center of lift shifting from one-forth of the wings' average wing chord during subsonic flying to one-half of average wing chord during supersonic flying only a small distance. The small change of center of lift and center of gravity during the yawing of wings and the small change of center of lift during the shifting from subsonic flying to supersonic flying make scissors wings configuration easy to control and have good stability.

Scissors wings configuration also does not have the control and stability problems caused by the shifting between the big-wing mode and small-wing mode of the inventions by Superala's Patent 505188 and Tammeo's Patent 510430. As the scissors wings are the only wings to generate lift, they do not need to be shifted with other wings in flight thus do not have the control and stability problems of Superala and Tammeo's inventions.

Fifth, the invention can make an air vehicle have high structural efficiency and is easy to manufacturer. Both main wings making up the scissors wings configuration are continuous and generally straight, making the wing structure have direct and short routes to transfer load. The main wings can also have relatively high relative thickness comparing with wings of low aspect ratio because big yaw angles from perpendicular to fuselage can ensure that they have subsonic normal component of incoming airflow when the air vehicle is flying at supersonic speed. For example, if an aircraft with scissors wings is flying at Mach 1.8 with its scissors wings yawed to be 60 degrees from perpendicular to fuselage, the normal component of incoming airflow is Mach 1.8 times cos(60°), which is March 0.9. The high relative thickness makes the main wing structure have high structural height to transfer bending moments. All these features help the main wing structure to be light and efficient. In addition, the pivots or hollow turrets that connect main wings to the fuselage can also be of lightweight. This is because each main wing has a structure that is continuous through out its pivot or turret thus neutralizes most of the bending moments it generates, making the pivot or turret of the wing sustains little, if any, bending moments. In comparison, the two pivot points of variable sweep wings configuration should be stronger thus heavier because they have to sustain the bending moments generated by the variable wings.

An air vehicle of scissors wings configuration is also easy to manufacturer. As the configuration conforms well to the "area rule", it does not need to have "wasp waist" on its fuselage. The main wings are also continuous and have a generally straight shape. In addition, the air vehicle's high lift-to-drag ratio (L/D) at low speed makes it able to take-off and land with low angle-of-attack, eliminating the need to have a movable nose like the one of Concorde. All these features make the air vehicle able to have simple shape and simple structure that are both easy and cost-effective to produce.

Sixth, the invention can make an air vehicle, especially an unmanned air vehicle, missile, or aerial bomb, be stored or carried with compact lateral dimension without adding significant weight and complexity. Both main wings of an air vehicle with scissors wings can be yawed so that the long axes of the main wings are generally parallel with the longitudinal axis of the fuselage of the air vehicle, making both main wings attached to the fuselage. This makes an air vehicle have compact lateral dimension without a folding device for wings. Comparing with the long track structure that is necessary to fold coplanar joined wings as shown in U.S. Pat. No. 5,899,410 issued to T. M. Garrett, scissors wings configuration is a simpler and lighter way to make air vehicles being stored or carried with compact lateral dimension.

BRIEF DESCRIPTION OF THE SEVERAL VIEWS OF THE DRAWING

In the drawings, closely related figures have the same number but different alphabetic suffixes.

DETAILED DESCRIPTION OF THE INVENTION—PREFERRED EMBODIMENT

FIG. 1A to FIG. 3C indicate the preferred embodiment of the invention.

Figure 1A:
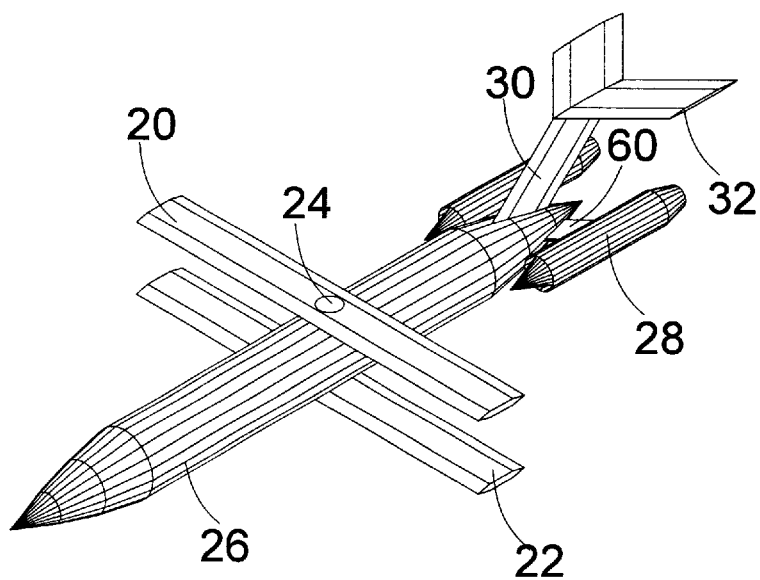
FIG. 1A shows an isometric view of an aircraft of scissors wings configuration in the condition of low speed flying, take-off, and landing with two main wings of the aircraft yawed to a position where the long axes of the main wings are generally perpendicular to the longitudinal axis of the fuselage of the aircraft.

As shown in FIG. 1A, the aircraft has a fuselage 26, an upper main wing 20 that is rotatably installed above fuselage 26 via pivot 24, and a lower main wing 22 that is rotatably installed beneath fuselage 26 via another pivot. The aircraft also have two engine nacelles 28 being installed on fuselage 26 via engine pylons 60, a vertical stabilizer 30, and a pair of horizontal stabilizers 32.

FIG. 1A indicates the arrangement of the scissors wings during low speed flying, take-off, and landing. In these conditions, the long axes of both upper main wing 20 and lower main wing 22 are generally perpendicular to the longitudinal axis of fuselage 26, making the aircraft virtually become a biplane with two generally straight, high aspect ratio main wings. This arrangement makes the aircraft have high lift-to-drag ratio (L/D) at low speed flying, take-off, and landing. Direct benefits resulted from this arrangement includes short take-off and landing distance as well as low engine thrust requirement, low noise level, and low fuel consumption during low speed flying, take-off, and landing. In addition, indirect benefits are also resulted from this arrangement, one of them is that the high lift-to-drag ratio (L/D) of the arrangement makes the aircraft able to use simple, cheap, and lightweight auxiliary lift-generating devices such as relatively simple flap systems. Another indirect benefit is that the aircraft does not need to have the movable nose like those of Concorde and Tupolev T-144 because when flying at the same speed, the aircraft can fly at a smaller angle-of-attack than aircraft with wings of low aspect ratio. The eliminating of a movable nose can reduce weight, cost, and improve reliability of the aircraft.

Figure 1B:
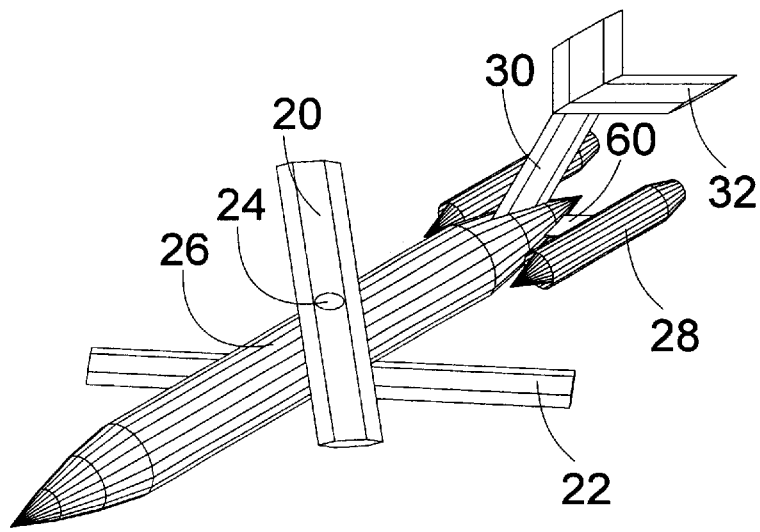
FIG. 1B shows an isometric view of the aircraft described in FIG. 1A in the condition of flying at a subsonic speed with two main wings of the aircraft yawed to an angle between zero degree and 90 degrees from perpendicular to fuselage to optimize the lift-to-drag ratio (L/D) of the aircraft.

Shown in FIG. 1B, the aircraft accelerates to a subsonic speed. Upper main wing 20 and lower main wing 22 are yawed at an angle from perpendicular to fuselage to make the aircraft flying at the maximum efficiency at this speed. By varying the yaw angle of the main wings, the aircraft can fly with high efficiency at almost any point within its flight envelope, including supersonic flying.

Figure 1C:
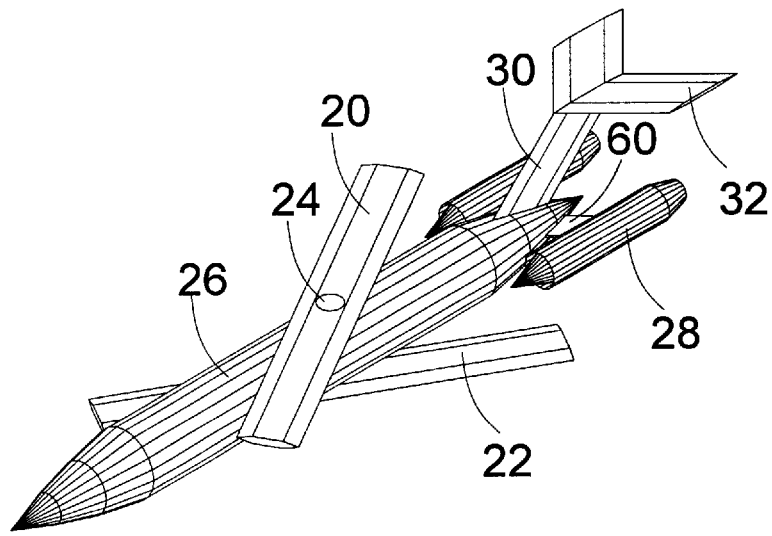
FIG. 1C shows an isometric view of the aircraft described in FIG. 1A in the condition of flying at a supersonic speed with two main wings of the aircraft yawed to a big angle between zero degree and 90 degrees from perpendicular to fuselage to optimize the lift-to-drag ratio (L/D) of the aircraft.

As indicated in FIG. 1C, the aircraft further accelerates to a supersonic speed. Upper main wing 20 and lower main wing 22 are yawed at a big angle from perpendicular to fuselage to reduce drag. This figure indicates that when both main wings are yawed at a big angle from perpendicular to fuselage, the cross-sectional area of the main wings is evenly distributed along the longitudinal axis of fuselage 26, making the aircraft very easy to conform to the "area rule". By adjusting yaw angle, the aircraft can fly with high efficiency at various supersonic speeds.

Figure 2A:
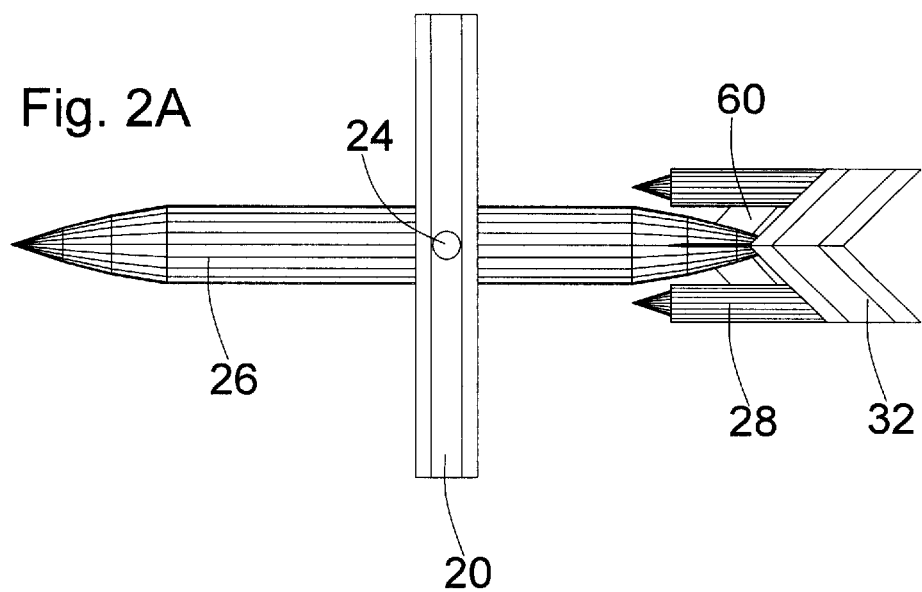
FIG. 2A shows a top plan view of the aircraft described in FIG. 1A in the condition of flying at low speed with two main wings of the aircraft yawed to a position where the long axes of the main wings are generally perpendicular to the longitudinal axis of the fuselage of the aircraft.
Figure 2B:
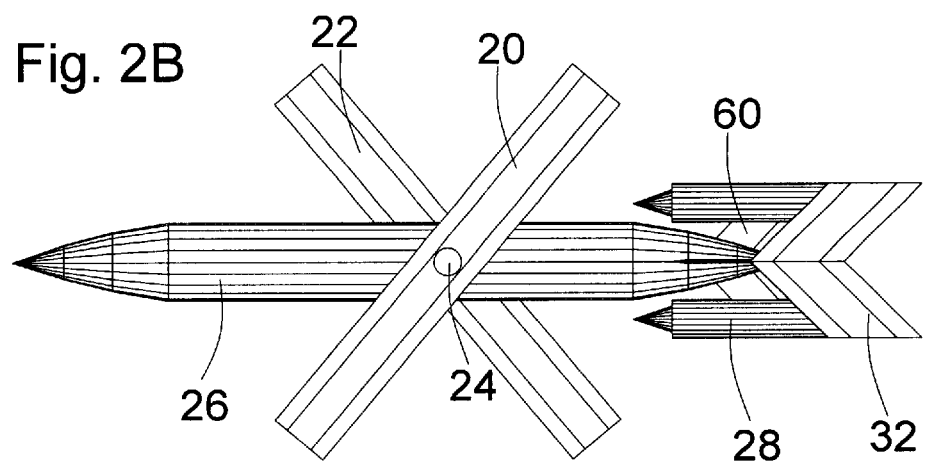
FIG. 2B shows a top plan view of the aircraft described in FIG. 1A in the condition of flying at a subsonic speed with two main wings of the aircraft yawed to an angle between zero degree and 90 degrees from perpendicular to fuselage to optimize the lift-to-drag (L/D) ratio of the aircraft.
Figure 2C:
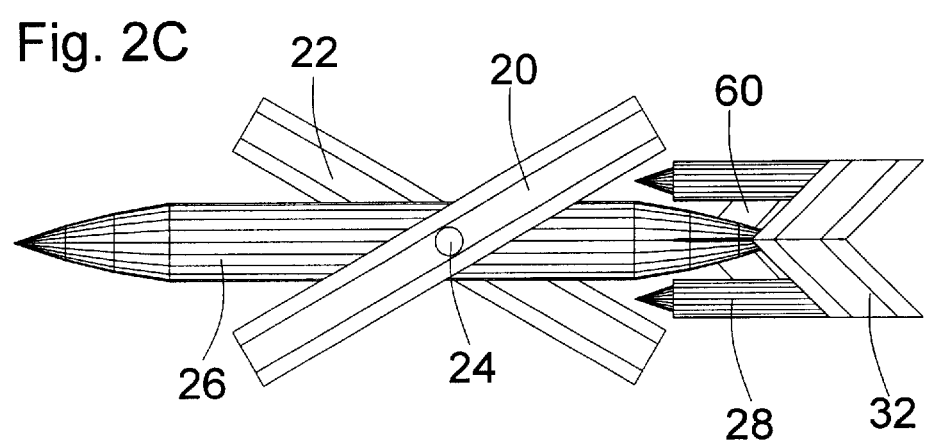
FIG. 2C shows a top plan view of the aircraft described in FIG. 1A in the condition of flying at a supersonic speed with two main wings of the aircraft yawed to a big angle between zero degree and 90 degrees from perpendicular to fuselage to optimize the lift-to-drag ratio (L/D) of the aircraft.

In order to clearly indicate how the scissors wings configuration optimize flying efficiency at different flying conditions, FIG. 2A to FIG. 2C show the top plan views of the aircraft flying at different speeds. FIG. 2A shows the aircraft in the condition of low speed flying, take-off, and landing. As both main wings of the aircraft are generally perpendicular to the longitudinal axis of fuselage 26, only upper main wing 20 can be seen from this figure. FIG. 2B shows the top plan view of the aircraft flying at a subsonic speed with its upper main wing 20 and lower main wing 22 yawed to an angle between zero to 90 degrees from perpendicular to fuselage. This figure also indicates that both of the main wings generate symmetric moments along the longitudinal axis of fuselage 26 when they are yawed to various angles, eliminating the stability and control problems that bother oblique wing configuration. FIG. 2C shows the top plan view of the aircraft flying at a supersonic speed with its upper main wing 20 and lower main wing 22 yawed to a big angle between zero to 90 degrees from perpendicular to fuselage. This figure indicates that the cross-sectional area of both main wings can be evenly distributed along the longitudinal axis of fuselage 26, making the aircraft very easy to conform to the "area rule". In addition, the aircraft does not need the upward curved ends of wings as required by oblique wing configuration because the symmetric scissors wings do not generate unexpected roll moments when the main wings are yawed at a big angle from perpendicular to fuselage.

Figure 3A:
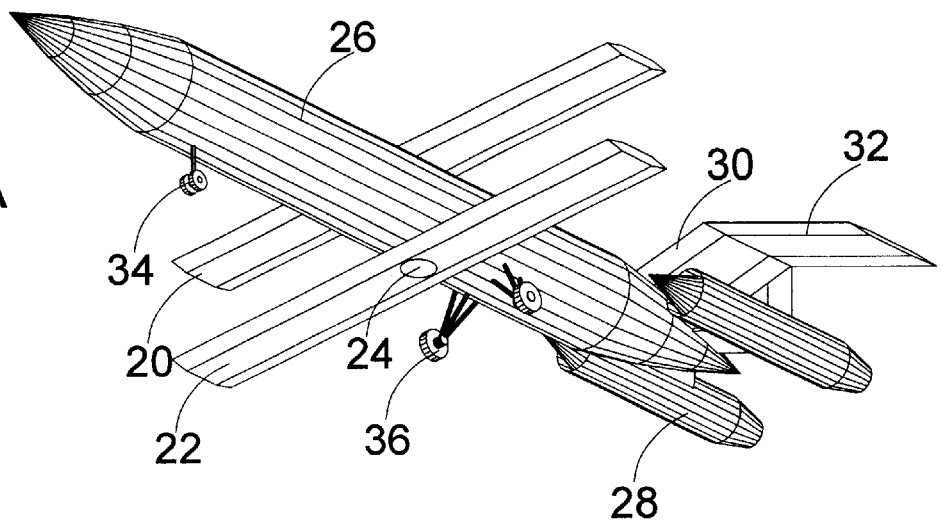
FIG. 3A, to FIG. 3C show bottom, front, and left side perspective views of the aircraft described in FIG. 1A with three of the many ways to arrange landing gears for the aircraft.
Figure 3B:
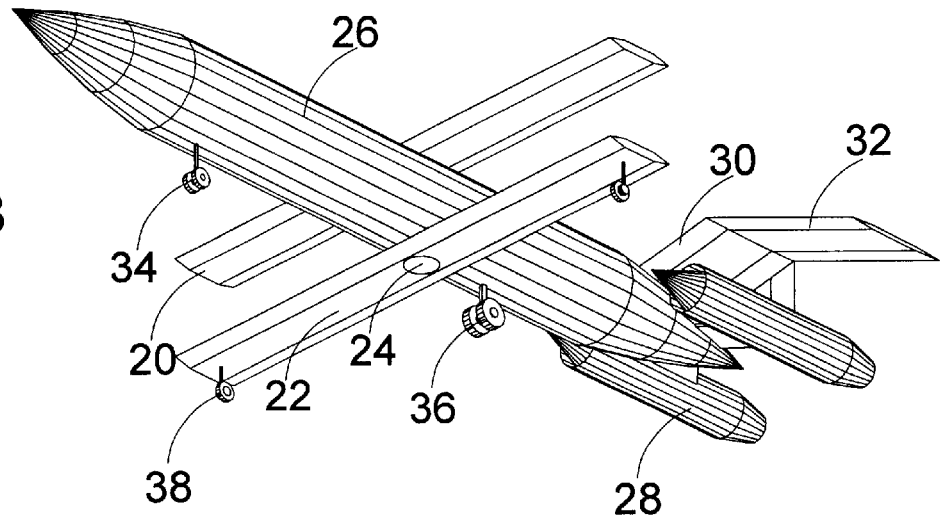
Figure 3C:
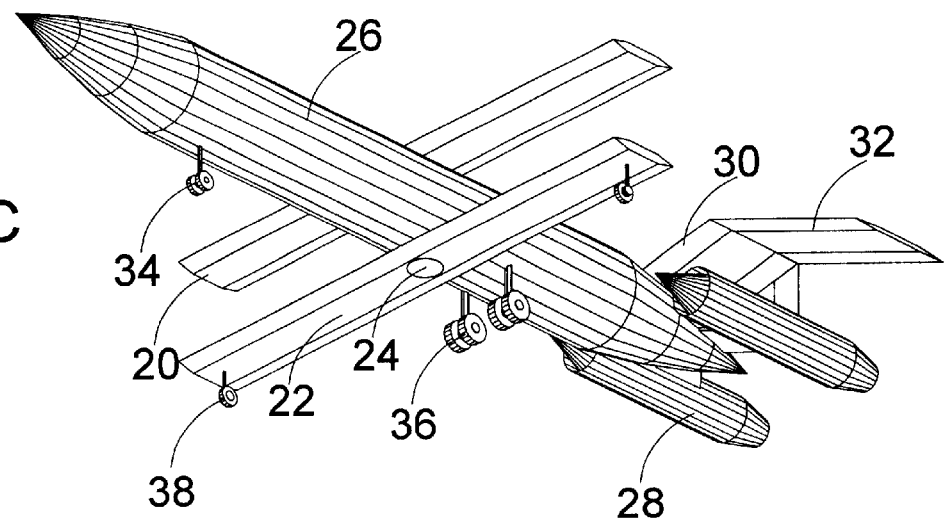

It is easy to arrange landing gears on an aircraft with scissors wings configuration. FIG. 3A to FIG. 3C show three of the many ways to arrange landing gears on the aircraft described in FIG. 1A to FIG. 2C. FIG. 3A shows the aircraft having an arrangement of retractable tricycle landing gears. Main landing gears 36 are installed on fuselage 26 behind lower main wing 22, which is yawed to be generally perpendicular to the longitudinal axis of fuselage 26. Nose landing gear 34 is installed on the front fuselage. The tricycle landing gears can be stretched out from and retracted into fuselage 26 during take-off, landing, and low speed flying because both of the main wings are yawed to be generally perpendicular to the longitudinal axis of fuselage 26 during these flying stages. The landing gears should be retraced into fuselage 26 when the aircraft flies at higher speeds thus do not obstruct the yawing of lower wing 22.

FIG. 3B shows the aircraft having an arrangement of retractable tandem landing gears. Similar to the tricycle landing gears of FIG. 3A, main landing gear 36 is installed on fuselage 26 behind lower main wing 22. Two outrigger landing gears 38 are installed on lower main wing 22. All the landing gears are retracted when the aircraft is flying at high speeds.

FIG. 3C shows an arrangement of landing gears that is between the tricycle and tandem arrangements. In this arrangement, two main landing gears 36 are installed on fuselage 26 behind lower main wing 22 and two outrigger landing gears are installed on lower main wing 22.

The three figures mentioned above indicate that it is easy to install different kinds of landing gears on an air vehicle with scissors wings configuration without obstructing the yawing movements of main wings.

DETAILED DESCRIPTION OF THE INVENTION—ALTERNATIVE EMBODIMENTS

Scissors Wings Configuration with Asymmetric Main Wings

As both main wings of scissors wings configuration are yawed symmetrically during steady flying, they generate symmetric moments along the longitudinal axis of the fuselage of an air vehicle even if each of the main wings is asymmetric itself or the axes of both of the main wings are laterally separated apart. This is a great advantage to achieve highly efficient flying because the swept-forward sides and swept-back sides of both main wings can be specifically optimized for flying without caring the symmetry of each main wing. FIG. 4A to FIG. 5C show one of the many kinds of asymmetric main wings with the left side and right side of each wing having different shapes; FIG. 6A to FIG. 7C show another one of many kinds of asymmetric main wings with the yawing axes of both main wings laterally separated apart.

Figure 4A:
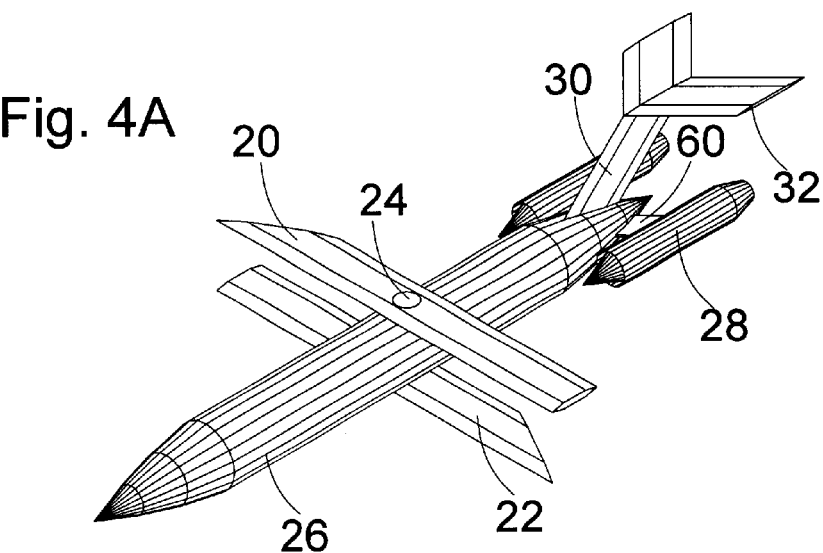
FIG. 4A shows an isometric view of an aircraft with an embodiment of scissors wings configuration in which the left and right side of each main wing of the aircraft do not have the same shape in the condition of low speed flying, take-off, and landing with two main wings yawed to a position where the long axes of the main wings are generally perpendicular to the longitudinal axis of the fuselage of the aircraft.

FIG. 4A shows an isometric view of an aircraft with an alternative embodiment of scissors wings configuration in the condition of low speed flying, take-off, and landing. As the figure indicates, the shapes of the aircraft's upper main wing 20 and lower main wing 22 are left-and-right asymmetric. Specifically, the right wingtip of upper main wing 20 is sharper than the left wingtip of the same wing, and the left wingtip of lower wing 22 is sharper than the right wingtip of the same wing. Although the left side and right side of each main wing might not generate the same lift, both main wings generate symmetric moments along the longitudinal axis of fuselage 26. Also as shown in this figure, the long axes of both of the main wings are yawed to be generally perpendicular to the longitudinal axis of fuselage 26 to maximize efficiency during low speed flying, take-off, and landing.

Figure 4B:
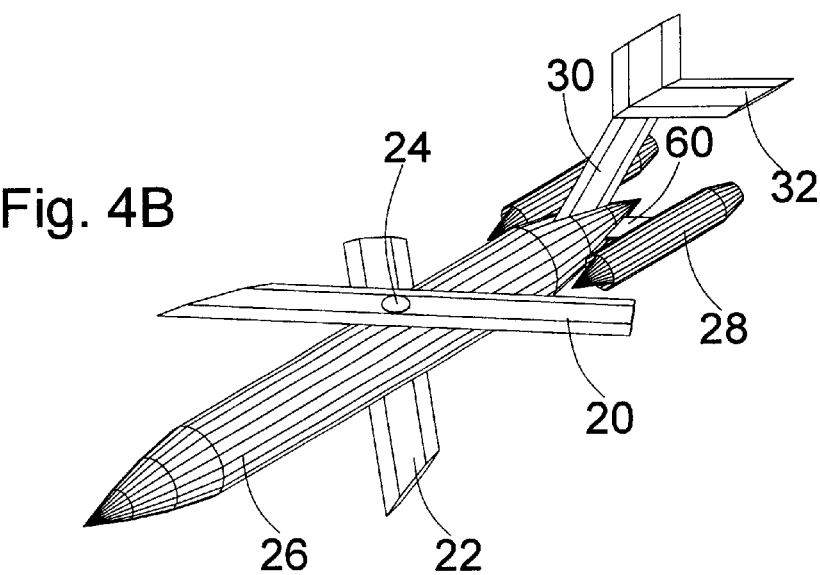
FIG. 4B shows an isometric view of the aircraft described in FIG. 4A in the condition of flying at a subsonic speed with two main wings of the aircraft yawed to an angle between zero degree and 90 degrees from perpendicular to fuselage to optimize the lift-to-drag ratio (L/D) of the aircraft.

FIG. 4B shows an isometric view of the aircraft described in FIG. 4A in the condition of flying at a subsonic speed with its upper main wing 20 and lower main wing 22 yawed to an angle from perpendicular to fuselage. As shown this figure, the aircraft still generates symmetric moments along the longitudinal axis of fuselage 26 even though the left side and right side of each main wing might not generate the same lift.

Figure 4C:
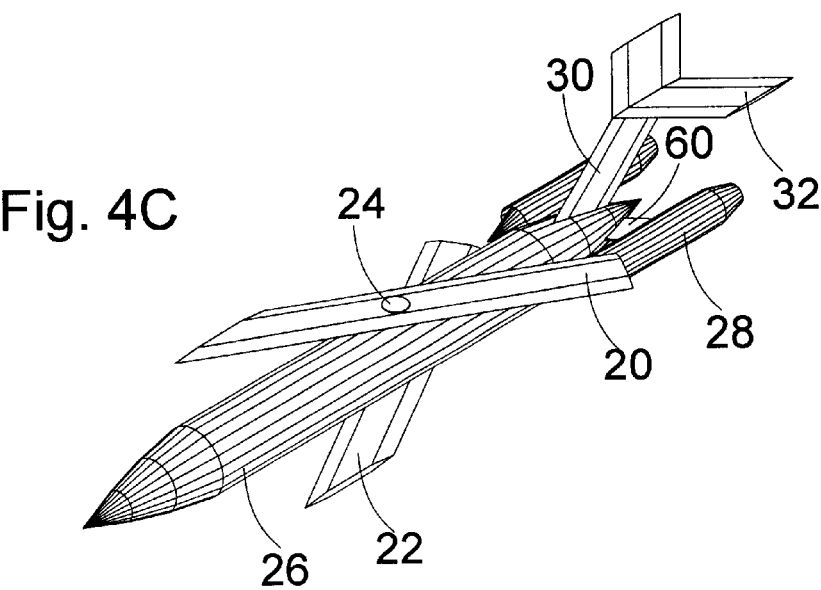
FIG. 4C shows an isometric view of the aircraft described in FIG. 4A in the condition of flying at a supersonic speed with two main wings of the aircraft yawed to a big angle between zero degree and 90 degrees from perpendicular to fuselage to optimize the lift-to-drag ratio (L/D) of the aircraft.

FIG. 4C shows an isometric view of the aircraft described in FIG. 4A in the condition of flying at a supersonic speed with its upper main wing 20 and lower main wing 22 yawed to a big angle from perpendicular to fuselage. Also as shown in this figure, the aircraft generates symmetric moments along the longitudinal axis of fuselage 26 even though the left side and right side of each main wing might not generate the same lift.

Figure 5A:
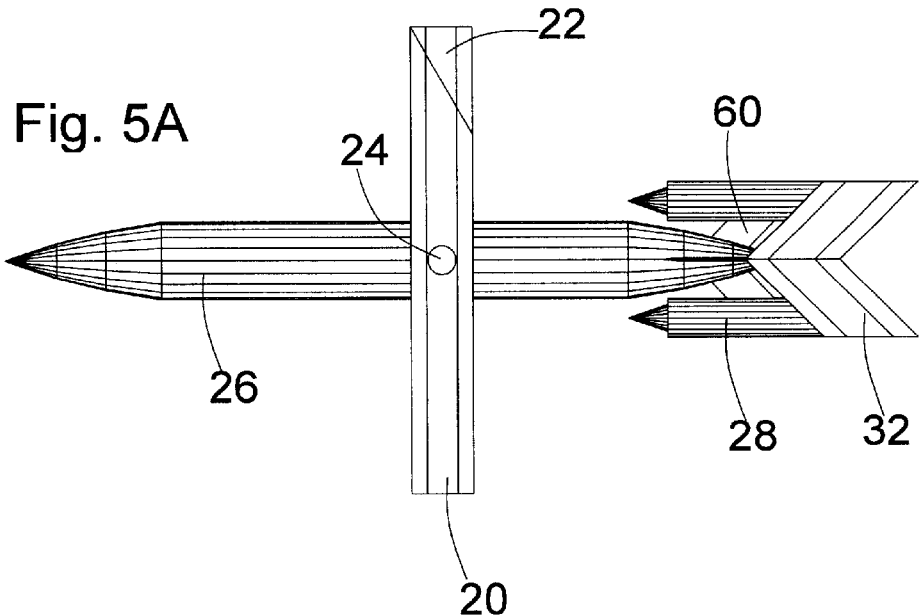
FIG. 5A shows a top plan view of the aircraft described in FIG. 4A in the condition of low speed flying, take-off, and landing with two main wings of the aircraft yawed to a position where the long axes of the main wings are generally perpendicular to the longitudinal axis of the fuselage.
Figure 5B:
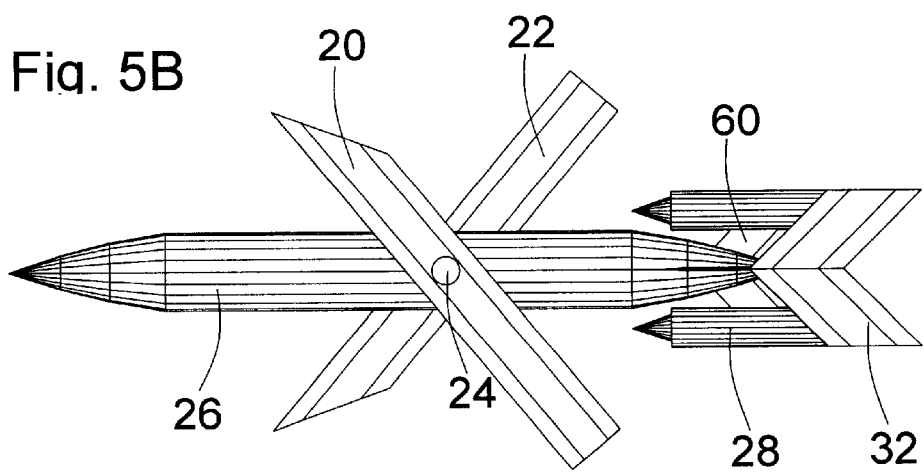
FIG. 5B shows a top plan view of the aircraft described in FIG. 4A in the condition of flying at a subsonic speed with two main wings of the aircraft yawed to an angle between zero degree and 90 degrees from perpendicular to fuselage to optimize the lift-to-drag ratio (L/D) of the aircraft.
Figure 5C:
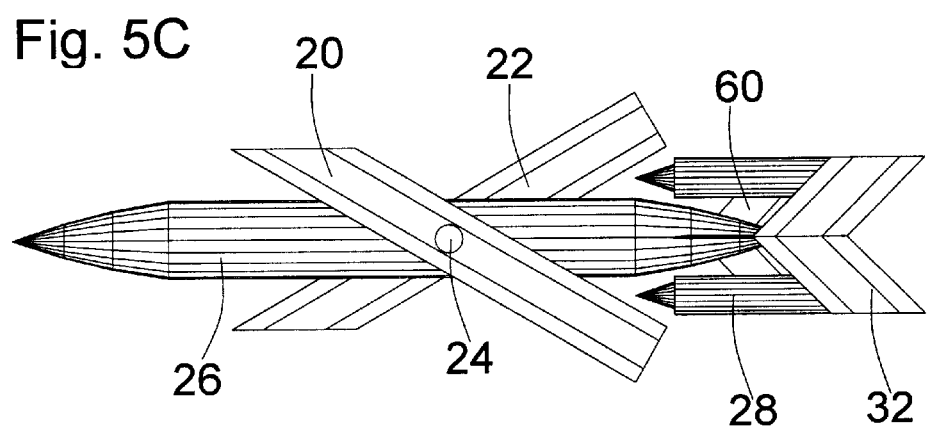
FIG. 5C shows a top plan view of the aircraft described in FIG. 4A in the condition of flying at a supersonic speed with two main wings of the aircraft yawed to a big angle between zero degree and 90 degrees from perpendicular to fuselage to optimize the lift-to-drag ratio (L/D) of the aircraft.

In order to clearly show the working of this alternative embodiment, FIG. 5A to FIG. 5C show the top plan views of the aircraft described in FIG. 4A to FIG. 4C in different flying conditions.

FIG. 5A shows the aircraft in the condition of low speed flying, take-off, and landing with both main wings yawed to be generally perpendicular to the longitudinal axis of fuselage 26. As indicated in the figure, the right wingtip of upper wing 20 is sharper than the left wingtip of the same main wing. Only the right wingtip of lower main wing 22 can be seen in this figure.

FIG. 5B shows the aircraft in the condition of flying at a subsonic speed with both main wings yawed to an angle from perpendicular to fuselage. This figure clearly indicates that when yawed to an angle, both main wings work together to generate symmetric moments along the longitudinal axes of fuselage 26 even though each main wing might not have the same lift on its left side and right side.

In FIG. 5C, the aircraft further increases its speed to supersonic with both of its main wings yawed to a big angle from perpendicular to fuselage. This figure indicates that the sharper wingtips of the swept-forward sides of both main wings can help the aircraft reduce supersonic drag, and the aircraft still generates symmetric moments along the longitudinal axis of fuselage 26.

Besides different left side and right side of each main wing, FIG. 6A to FIG. 7C show another kind of asymmetric main wings whose yawing axes are laterally separated apart.

Figure 6A:
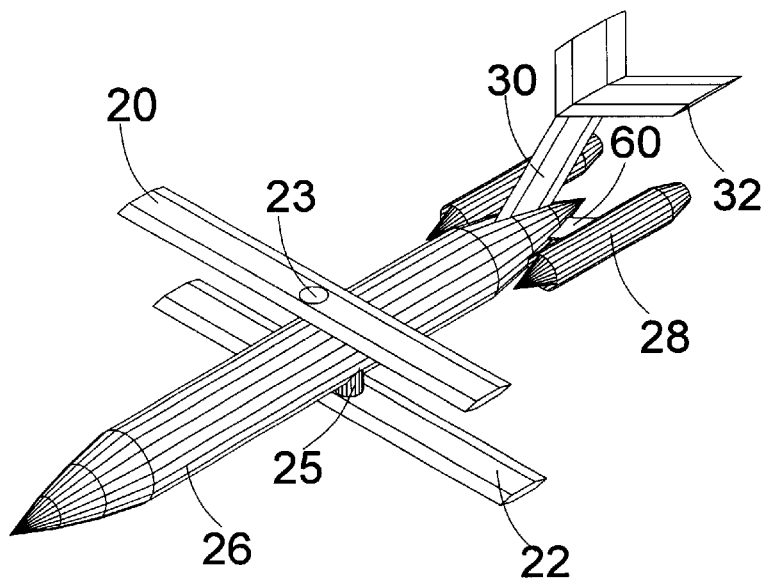
FIG. 6A shows an isometric view of an aircraft with an embodiment of scissors wings configuration in which the pivot of upper main wing is located at upper-right side of the fuselage of the aircraft and the pivot of lower main wing is located at lower-left side of the fuselage in the condition of low speed flying, take-off, and landing with two main wings yawed to a position where the long axes of the main wings are generally perpendicular to the longitudinal axis of the fuselage.
Figure 6B:
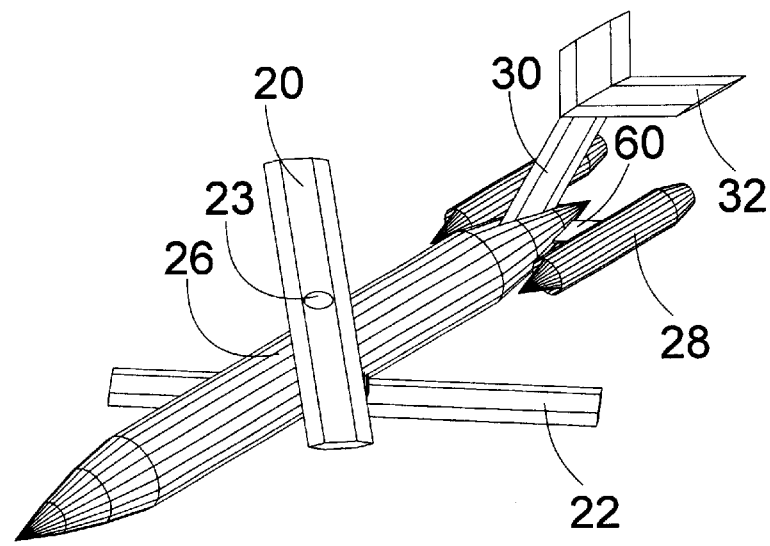
FIG. 6B shows an isometric view of the aircraft described in FIG. 6A in the condition of flying at a subsonic speed with two main wings of the aircraft yawed to an angle between zero degree and 90 degrees from perpendicular to fuselage to optimize the lift-to-drag ratio (L/D) of the aircraft.
Figure 6C:
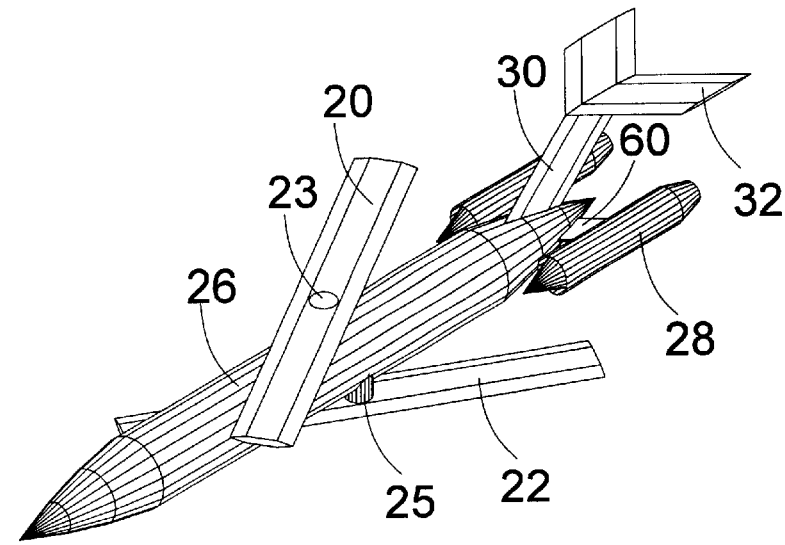
FIG. 6C shows an isometric view of the aircraft described in FIG. 6A in the condition of flying at a supersonic speed with two main wings of the aircraft yawed to a big angle between zero degree and 90 degrees from perpendicular to fuselage to optimize the lift-to-drag ratio (L/D) of the aircraft.

As shown in FIG. 6A, an aircraft is in the condition of low speed flying, take-off, and landing. It's upper main wing 20 is rotatably mounted above fuselage 26 via right pivot 23, making the yawing axis of upper main wing 20 located on the upper-right side of fuselage 26. The aircraft's lower main wing 22 is rotatably mounted beneath fuselage 26 via left pivot 25, making the yawing axis of lower main wing 22 located on the lower-left side of fuselage 26. Also as indicated in FIG. 6A, the long axes of both of the main wings are generally perpendicular to the longitudinal axis of fuselage 26 to make the aircraft best fit the flying conditions of low speed flying, take-off, and landing. In FIG. 6B, the aircraft described in FIG. 6A accelerates to a subsonic speed and in FIG. 6C, the aircraft further accelerates to a supersonic speed. In both FIG. 6B and FIG. 6C, both of the main wings are yawed to optimize flying efficiency.

Figure 7A:
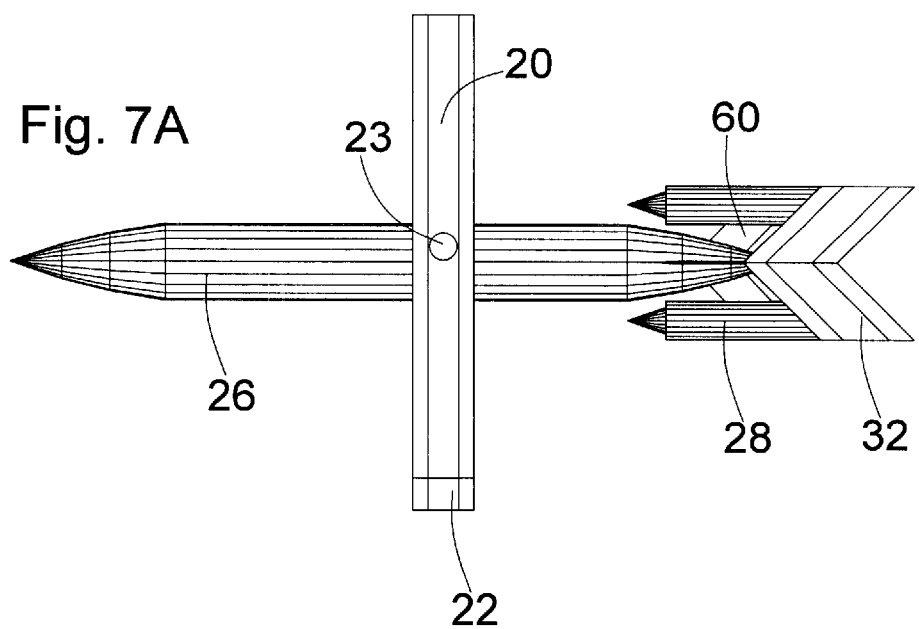
FIG. 7A shows a top plan view of the aircraft described in FIG. 6A in the condition of low speed flying, take-off, and landing with two main wings of the aircraft yawed to a position where the long axes of the main wings are generally perpendicular to the longitudinal axis of the fuselage of the aircraft.
Figure 7B:
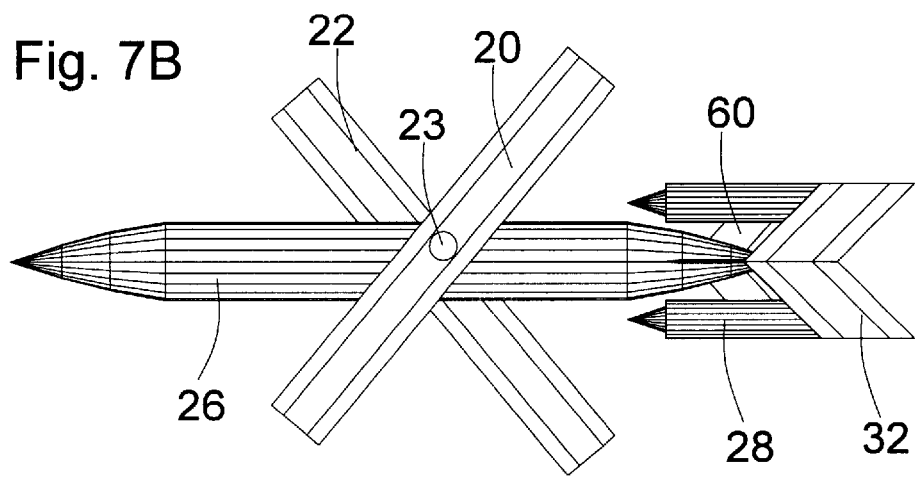
FIG. 7B shows a top plan view of the aircraft described in FIG. 6A in the condition of flying at a subsonic speed with two main wings of the aircraft yawed to an angle between zero degree and 90 degrees from perpendicular to fuselage to optimize the lift-to-drag ratio (L/D) of the aircraft.
Figure 7C:
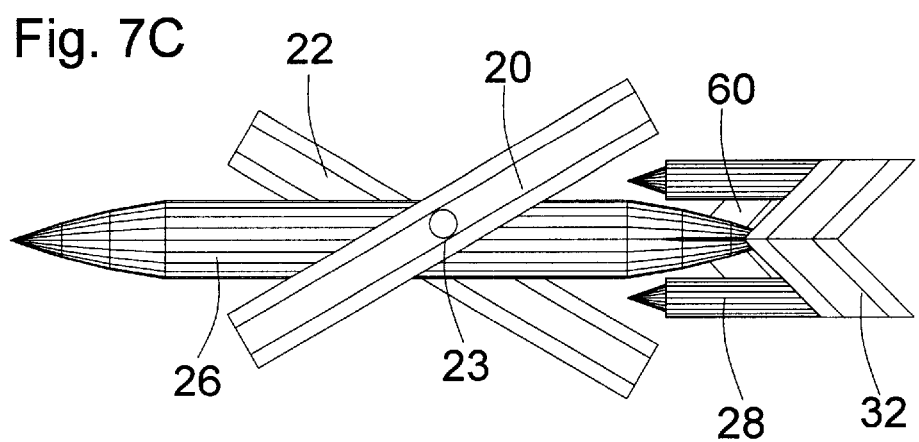
FIG. 7C shows a top plan view of the aircraft described in FIG. 6A in the condition of flying at a supersonic speed with two main wings of the aircraft yawed to a big angle between zero degree and 90 degrees from perpendicular to fuselage to optimize the lift-to-drag ratio (L/D) of the aircraft.

In order to clearly show the arrangement of laterally separated pivots, FIG. 7A to FIG. 7C show the top plan views of the aircraft described above in various flying conditions.

In FIG. 7A, the aircraft is in the condition of low speed flying, take-off, and landing. Upper-right pivot 23 can be seen located on the upper-right side of fuselage 26, making upper main wing 20 moved to right side comparing with the preferred embodiment. The left wingtip of lower main wing 22 can be seen in this figure because while upper main wing 20 is moved to the right, lower main wing 22 is moved to the left.

In FIG. 7B to FIG. 7C, the aircraft accelerates its speed and both of the main wings are yawed to optimize the aircraft's flying efficiency at different speeds. These figures indicate that the aircraft generates symmetric moments along the longitudinal axis of its fuselage.

Figure 8A:
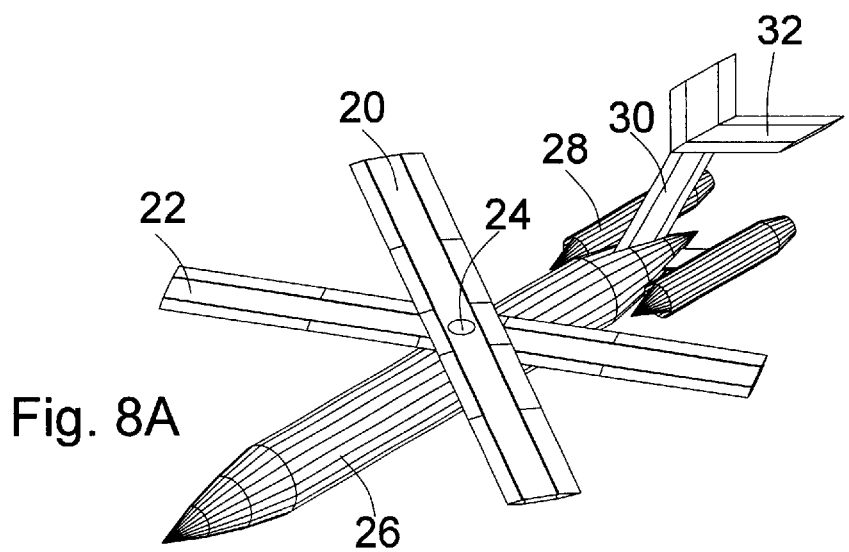
FIG. 8A shows an isometric view of an aircraft with an embodiment of scissors wings configuration in which both main wings are installed above the fuselage of the aircraft in the condition of low speed flying, take-off, and landing with two main wings yawed to a small angle between zero degree and 90 degrees from perpendicular to fuselage.
Figure 8B:
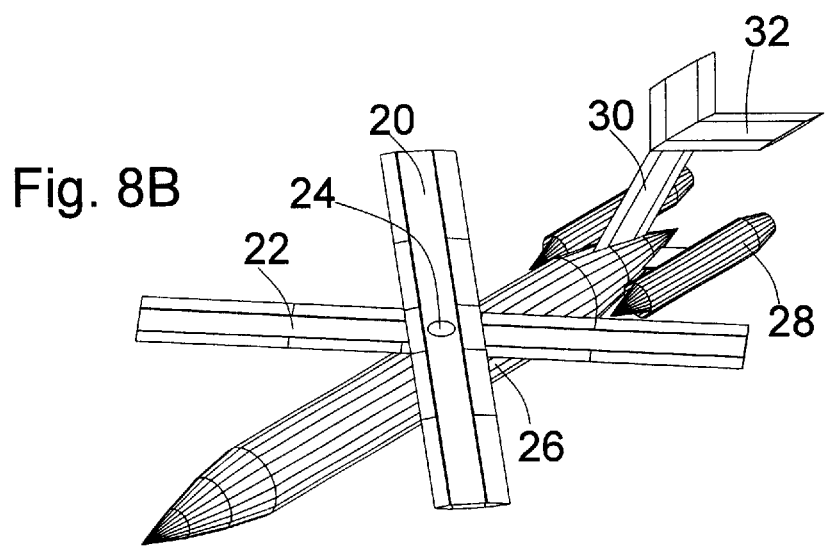
FIG. 8B shows an isometric view of the aircraft described in FIG. 8A in the condition of flying at a subsonic speed with two main wings of the aircraft yawed to an angle between zero degree and 90 degrees from perpendicular to fuselage to optimize the lift-to-drag ratio (L/D) of the aircraft.
Figure 8C:
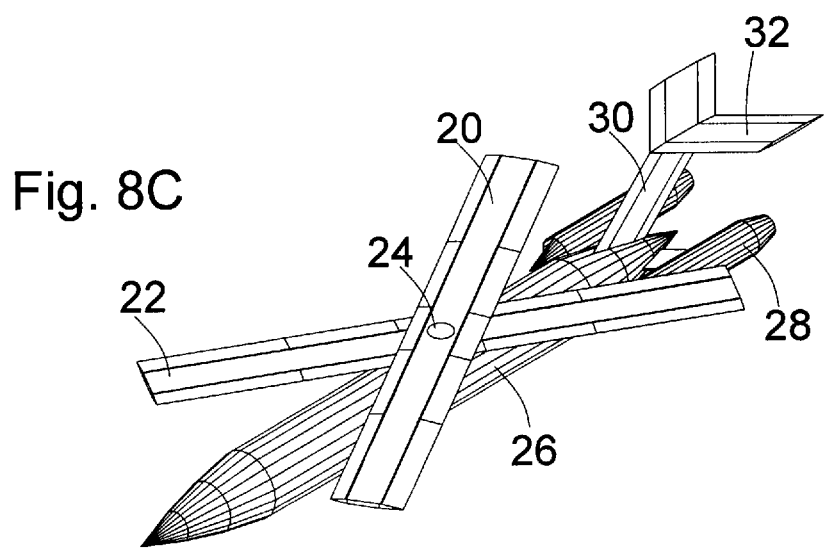
FIG. 8C shows an isometric view of the aircraft described in FIG. 8A in the condition of flying at a supersonic speed with two main wings of the aircraft yawed to a big angle between zero degree and 90 degrees from perpendicular to fuselage to optimize the lift-to-drag ratio (L/D) of the aircraft.
Figure 9A:
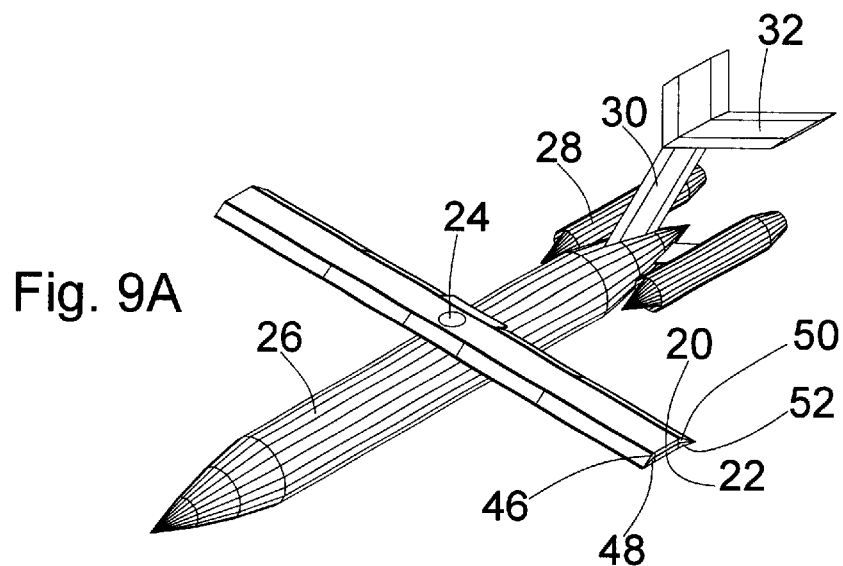
FIG. 9A shows an isometric view of an aircraft with an embodiment of scissors wings configuration in which both main wings are installed above the fuselage of the aircraft in the condition of low speed flying, take-off, and landing with two main wings yawed to a position where the long axes of the main wings are generally perpendicular to the longitudinal axis of the fuselage and the leading edge and trailing edge flaps as well as flaperons and/or ailerons of both main wings are adjusted in a way that the two main wings form a single wing.
Figure 9B:
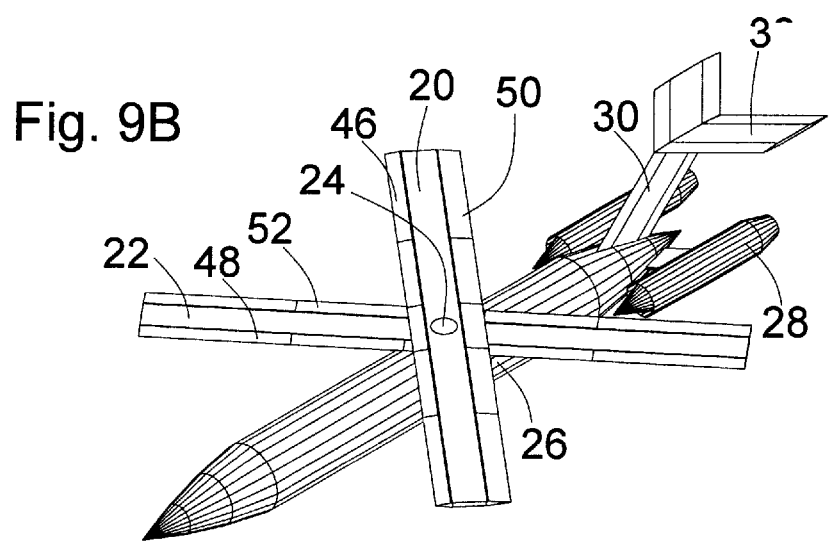
FIG. 9B shows an isometric view of the aircraft described in FIG. 9A in the condition of flying at a subsonic speed with two main wings of the aircraft yawed to an angle between zero degree and 90 degrees from perpendicular to fuselage to optimize the lift-to-drag ratio (L/D) of the aircraft.
Figure 9C:
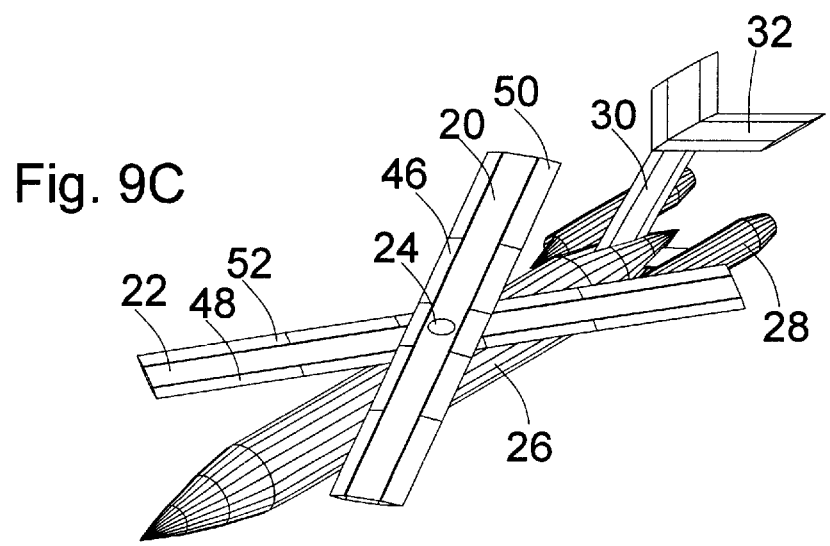
FIG. 9C shows an isometric view of the aircraft described in FIG. 9A in the condition of flying at a supersonic speed with two main wings of the aircraft yawed to a big angle between zero degree and 90 degrees from perpendicular to fuselage to optimize the lift-to-drag ratio (L/D) of the aircraft.

Scissors Wings Configuration with Both Main Wings on the Same Side of Fuselage Scissors wings can also be mounted on the same side of the fuselage of an air vehicle. One way to install both main wings is to mount both of them above or at the upper part of fuselage; another way to install both main wings is to mount both of them beneath or at the lower part of fuselage. FIG. 8A to FIG. 8C show one alternative embodiment of scissors wings configuration with both wings installed on the same side of fuselage and FIG. 9A to FIG. 9C show another alternative embodiment of installing both main wings on the same side of fuselage.

FIG. 8A shows an aircraft in the condition of low speed flying, take-off, and landing. As shown in the figure, upper main wing 20 is installed above lower main wing 22 and both of them are rotatably mounted above fuselage 26 via pivot 24. Both of the main wings are yawed to a small angle from perpendicular to fuselage to generate high lift during low speed flying, take-off, and landing.

When speed increases, both main wings are yawed to a bigger angle to maximize flying efficiency, as shown in FIG. 8B.

With speed further increased to supersonic speed, both main wings are yawed to an even bigger angle from perpendicular to fuselage as indicated in FIG. 8C to achieve efficient supersonic flying.

FIG. 9A shows another alternative embodiment of an air vehicle with both main wings installed on one side of fuselage in the condition of low speed flying, take-off, and landing. Under this embodiment, upper main wing 20 is installed above lower main wing 22 and both of them are rotatably mounted above fuselage 26 via pivot 24. During low speed flying, take-off, and landing, both of the main wings are yawed to be generally perpendicular to the longitudinal axis of fuselage 26 as shown in FIG. 9A. Also indicated in FIG. 9A, while leading edge flaps 48 and trailing edge flaperons 52 of lower main wing 22 are dropped down, leading edge flaps 46 and trailing edge flaperons 50 of upper main wing 20 are further dropped down to touch their counter parts of lower main wing 22 respectively, making both main wings to form a single straight wing. This straight, high aspect ratio, and high thickness single wing can achieve high lift-to-drag ratio for the aircraft during low-speed flying, take-off, and landing.

When the aircraft increases speed, both of the main wings are yawed to an angle from perpendicular to fuselage to maximize flying efficiency, as shown in FIG. 9B.

In FIG. 9C, the aircraft further increases its speed and the yawing angle from perpendicular to fuselage of both of the main wings becomes even bigger to reduce drag.

Scissors Wings Configuration with Compact Lateral Dimension for Carrying and Storage Scissors wings configuration can help air vehicles, especially unmanned air vehicles, missiles, and aero bombs have compact lateral dimension for carrying and storage without adding additional weight and complexity. FIG. 10A to FIG. 11B show an arrangement of scissors wings configuration of a missile, FIG. 12A and FIG. 12B show another arrangement of scissors wings configuration of a missile.

Figure 10A:
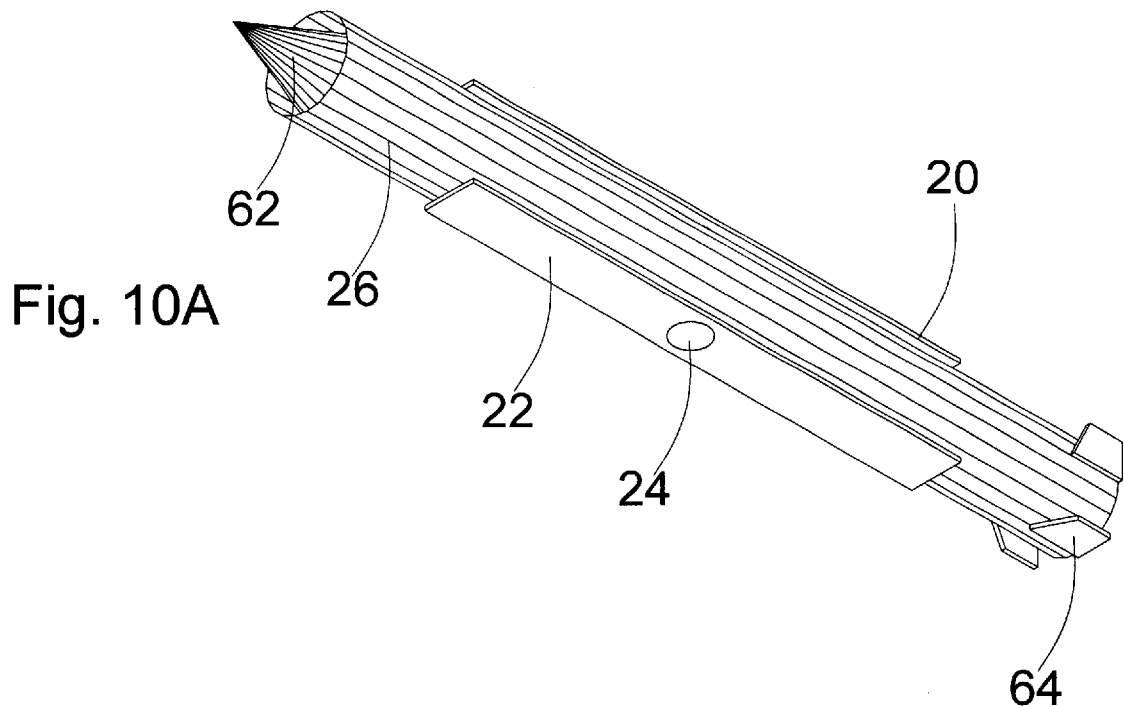
FIG. 10A shows a bottom, front, and left side perspective view of a missile with an embodiment of scissors wings configuration in which one main wing of the missile is installed above the fuselage of the missile and another main wing is installed beneath the fuselage in the condition of storage or being carried by a carrier like an aircraft or submarine with two main wings yawed to a position where the long axes of the main wings are generally parallel with the longitudinal axis of the fuselage to minimize the lateral dimension of the missile.

In FIG. 10A, a missile is in the condition of storage or being carried by a carrier such as an aircraft. Lower main wing 22 is installed beneath fuselage 26 via pivot 24; upper main wing 20 is installed above fuselage 26 via another pivot. Both of the main wings are yawed so that the long axes of them are generally parallel to the longitudinal axis of fuselage 26. Controlling surfaces 64 are folded. At the forefront of fuselage 26 is conical intake center body 62. As indicated in the figure, the missile can minimize its lateral dimension simply by yawing both of the main wings.

Figure 10B:
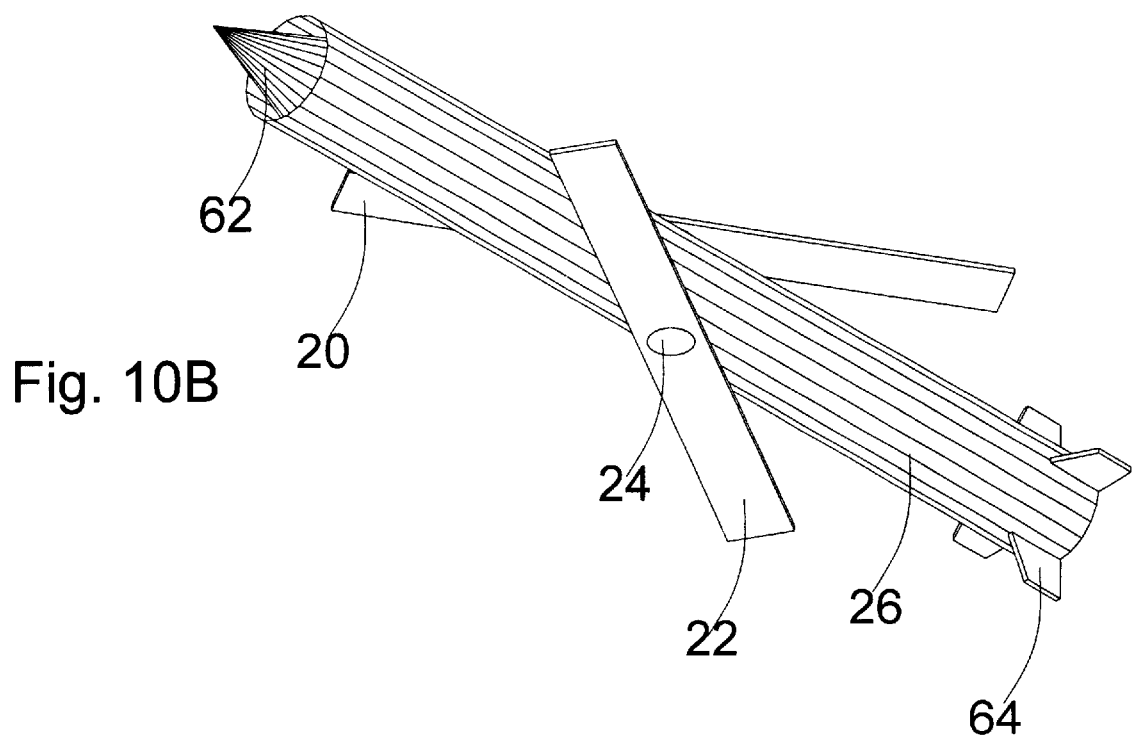
FIG. 10B shows a bottom, front, and left side perspective view of the missile described in FIG. 10A in the condition of flying at high speed with two main wings of the missile yawed to a big angle between zero degree and 90 degrees from perpendicular to fuselage to optimize the lift-to-drag ratio (L/D of the missile.

FIG. 10B shows the missile described in FIG. 10A flying at a high speed with upper main wing 20 and lower main wing 22 yawed to a big angle between zero to 90 degrees from perpendicular to fuselage. Control surfaces 64 are unfolded to realize control of the missile. Both of the main wings can be yawed to different angles to maximize flying efficiency of the missile at different flying conditions.

Figure 11A:
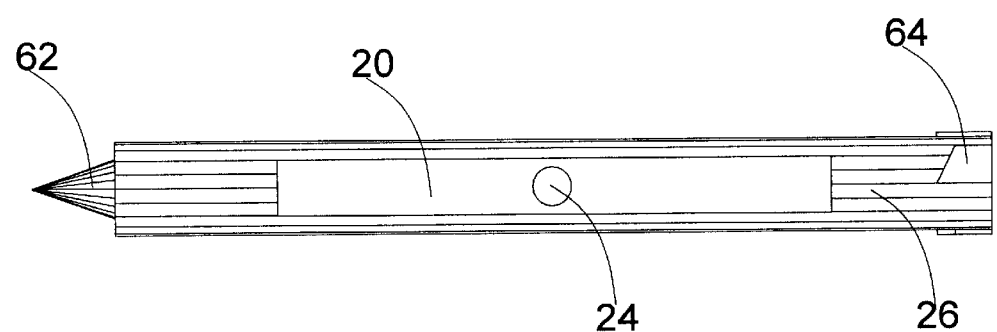
FIG. 11A shows a top plan view of the missile described in FIG. 10A in the condition of storage or being carried by a carrier like an aircraft or submarine with two main wings of the missile yawed to a position where the long axes of the main wings are generally parallel with the longitudinal axis of the fuselage of the missile to minimize the lateral dimension of the missile.
Figure 11B:
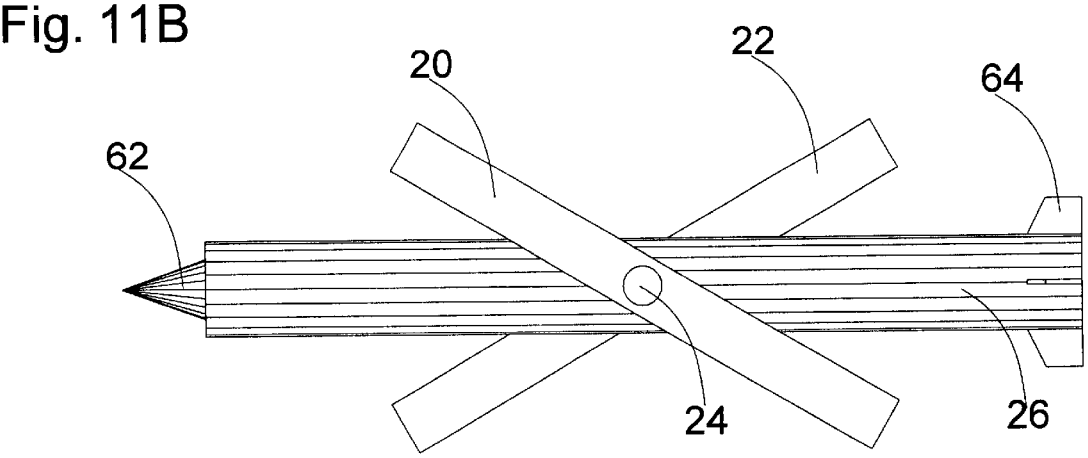
FIG. 11B shows a top plan view of the missile described in FIG. 10A in the condition of flying at high speed with two main wings of the missile yawed to a big angle between zero degree and 90 degrees from perpendicular to fuselage to optimize the lift-to-drag ratio (L/D) of the missile.
Figure 12A:
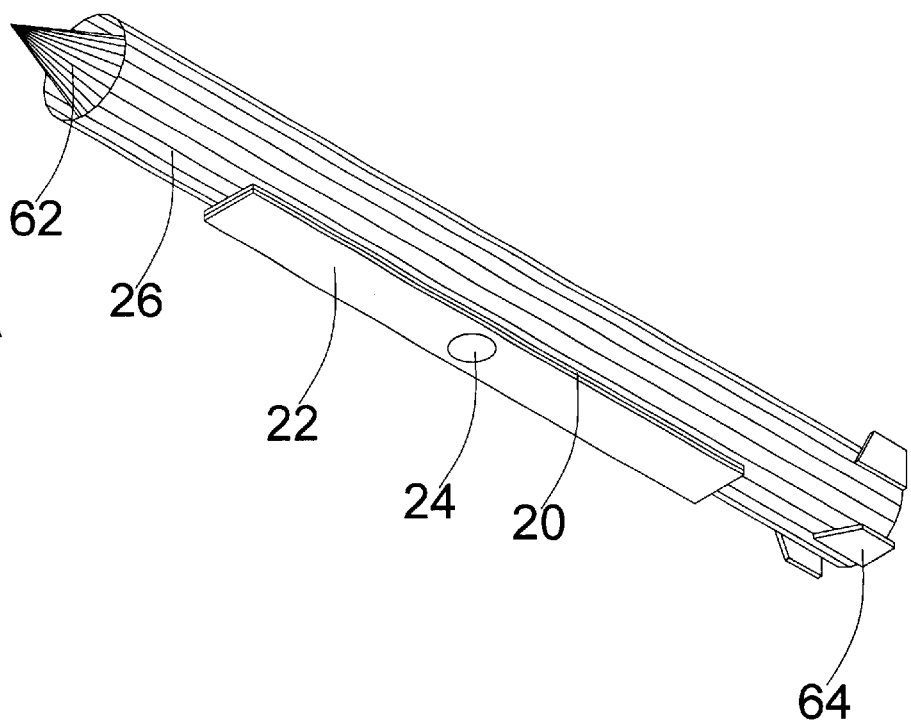
FIG. 12A shows a bottom, front, and left side view of a missile with an embodiment of scissors wings configuration in which both main wings of the missile are installed beneath the fuselage of the missile in the condition of storage or being carried by a carrier like an aircraft or submarine with two main wings yawed to a position where the long axes of the main wings are generally parallel with the longitudinal axis of the fuselage to minimize the lateral dimension of the missile.
Figure 12B:
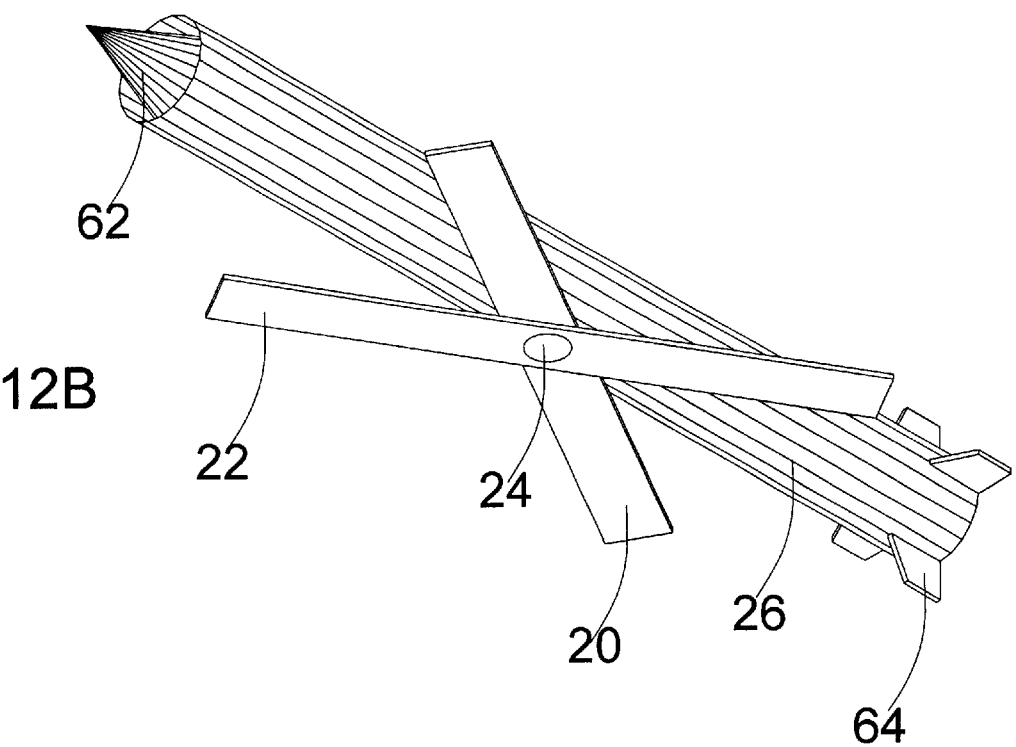
FIG. 12B shows a bottom, front, and left side view of the missile described in FIG. 12A in the condition of flying at high speed with two main wings of the missile yawed to a big angle between zero degree and 90 degrees from perpendicular to fuselage to optimize the lift-to-drag ratio (L/D) of the missile.

FIG. 11A is a top plan view of the missile shown in FIG. 10A with both of the main wings yawed to the position for storage and carrying. Control surfaces 64 are folded. FIG. 11B is a top plan view of the same missile with both of the main wings yawed to a big angle from perpendicular to fuselage to help the missile fly at a high speed. Control surfaces 64 are unfolded to control the missile.

FIG. 12A and FIG. 12B show another arrangement of scissors wings on a missile. Both upper main wing 20 and lower main wing 22 are mounted beneath fuselage 26 via pivot 24 with upper main wing 20 installed above lower main wing 22. In FIG. 12A, the missile is in the condition of storage or being carried by a carrier like an aircraft with both of the main wings yawed to be generally parallel with the longitudinal axis of fuselage 26. Control surfaces 64 of the missile are folded. FIG. 12B shows the missile flying at a high speed with both of the main wings yawed to a big angle from perpendicular to fuselage and the control surfaces unfolded.

DETAILED DESCRIPTION OF THE INVENTION—CONCLUSION, RAMIFICATIONS, AND SCOPE

Accordingly, the reader will see that the scissors wings configuration can make an air vehicle flying at a wide range of speed in a highly cost-efficient and effective way. The cost-efficiency is achieved by the scissors wings' ability to have the optimum lift-to-drag ratio (L/D) at different flying conditions and flying stages so that low fuel consumption can be achieved throughout flying. The cost-efficiency is also achieved by the simple and low cost structure a scissors wings configuration requires, such as the elimination of "wasp waist" and movable nose, the light-weight pivots or hollow turrets that transfer little bending moments, and the continuous, generally straight main wing structure.

The effectiveness is realized by the non-sonic-boom flying at transonic and low supersonic speeds, the short take-off and landing distances, the low engine noise level, the good controllability and stability, and the simple structure that are easy to manufacture. Scissors wings configuration is also able to help an air vehicle, especially an unmanned air vehicle, missile, or aero bomb, minimize its lateral dimension for storage and carrying without adding additional structure and weight.

Although the description in the above summary and descriptions contains many specificities, these should not be construed as limiting the scope of the invention but as merely providing illustrations of some of the presently preferred embodiments of this invention. For example, instead of having different plane shapes as shown in FIG. 4A to FIG. 5C, an asymmetric main wing of scissors wings configuration can have different airfoils on its left side and right side, or have both different plane shapes and different airfoils on its left side and right side. On the contrary, within the scope of protection, the configuration according to the invention may also assume embodiments other than those described above. In this case, the configuration may, in particular, have features that constitute a combination of the respective individual features of the claims.

I claim:

1. An air vehicle having scissors wings comprising:
   (a) at least one fuselage means, and
   (b) two wing means, and
   (c) said two wing means are the only wing means that generate lift for said air vehicle at flight except control surfaces including canards, horizontal tail, elevators, and said fuselage means, and
   (d) each of the wing means has a left side wing and a right side wing, and
   (e) both of the wing means are rotatably mounted on the fuselage means via at least one pivot means or hollow turret means, and
   (f) the two wing means can be yawed in opposite directions about said pivot means or hollow turret means, and
   whereby the air vehicle can optimize its flying efficiency at various flying conditions by adjusting the yaw angles of both of the wing means.

2. The air vehicle of claim 1 wherein said right side wing and left side wing of each of the wing means are different from each other.

* * * * *